(12) United States Patent
Lu et al.

(10) Patent No.: US 11,270,688 B2
(45) Date of Patent: Mar. 8, 2022

(54) DEEP NEURAL NETWORK BASED AUDIO PROCESSING METHOD, DEVICE AND STORAGE MEDIUM

(71) Applicant: EVOCO LABS CO., LTD., Shanghai (CN)

(72) Inventors: Congxi Lu, Shanghai (CN); Linkai Li, Shanghai (CN); Hongcheng Sun, Shanghai (CN); Xinke Liu, Shanghai (CN)

(*) Notice: Subject to any disclaimer, the term of this patent is extended or adjusted under 35 U.S.C. 154(b) by 117 days.

(21) Appl. No.: 16/930,337

(22) Filed: Jul. 16, 2020

(65) Prior Publication Data

US 2021/0074266 A1    Mar. 11, 2021

(30) Foreign Application Priority Data

Sep. 6, 2019   (CN) .......................... 201910843603.0

(51) Int. Cl.
  *G10L 15/06*    (2013.01)
  *G06F 17/14*    (2006.01)
  (Continued)

(52) U.S. Cl.
  CPC ............ *G10L 15/063* (2013.01); *G06F 17/14* (2013.01); *G06N 3/049* (2013.01); *G06N 3/084* (2013.01);
  (Continued)

(58) Field of Classification Search
  CPC ....... G10L 15/063; G10L 15/16; G10L 15/20; G10L 21/02; G10L 21/0224; G10L 25/90; G10L 25/93; H04R 25/00; H04R 25/507
  See application file for complete search history.

(56) References Cited

U.S. PATENT DOCUMENTS

| 10,462,582 | B2* | 10/2019 | Neumeyer | ........... H04R 25/552 |
| 2005/0105750 | A1* | 5/2005 | Frohlich | .............. H04R 25/507 |
| | | | | 381/314 |

(Continued)

FOREIGN PATENT DOCUMENTS

CN          109147808 A       1/2019

OTHER PUBLICATIONS

The first office action for Chinese application No. 201910843603.0, dated Jun. 16, 2021.

(Continued)

*Primary Examiner* — Shaun Roberts
(74) *Attorney, Agent, or Firm* — Jun He Law Offices P.C.; Zhaohui Wang (57) ABSTRACT

A deep neural network based audio processing method is provided. The method includes: obtaining a deep neural network based speech extraction model; receiving an audio input object having a speech portion and a non-speech portion, wherein the audio input object includes one or more audio data frames each having a set of audio data samples sampled at a predetermined sampling interval and represented in time domain data format; obtaining a user audiogram and a set of user gain compensation coefficients associated with the user audiogram; and inputting the audio input object and the set of user gain compensation coefficients into the trained speech extraction model to obtain an audio output result represented in time domain data format outputted by the trained speech extraction model, wherein the non-speech portion of the audio input object is at least partially attenuated in or removed from the audio output result.

18 Claims, 6 Drawing Sheets

(51) Int. Cl.
    *G06N 3/04*     (2006.01)
    *G06N 3/08*     (2006.01)
    *G10L 15/16*     (2006.01)
    *G10L 19/005*     (2013.01)
    *G10L 19/083*     (2013.01)
    *G10L 25/30*     (2013.01)
    *H04R 25/00*     (2006.01)
    *G10L 21/0208*     (2013.01)
    *G10L 21/0364*     (2013.01)

(52) U.S. Cl.
    CPC ............ G10L 15/16 (2013.01); G10L 19/005 (2013.01); G10L 19/083 (2013.01); G10L 21/0208 (2013.01); G10L 25/30 (2013.01); H04R 25/507 (2013.01); H04R 25/70 (2013.01); *G10L 21/0364* (2013.01); *H04R 2225/43* (2013.01)

(56) References Cited

U.S. PATENT DOCUMENTS

| | | | |
|---|---|---|---|
| 2010/0027820 A1* | 2/2010 | Kates | H04R 25/505 381/312 |
| 2011/0191101 A1* | 8/2011 | Uhle | G10L 21/0208 704/205 |
| 2011/0200214 A1* | 8/2011 | Knox | H04R 25/50 381/314 |
| 2015/0066499 A1* | 3/2015 | Wang | G10L 25/30 704/233 |
| 2017/0061978 A1* | 3/2017 | Wang | H04R 25/43 |
| 2019/0222943 A1* | 7/2019 | Andersen | G10L 25/84 |
| 2020/0268260 A1* | 8/2020 | Tran | A61B 5/6898 |

OTHER PUBLICATIONS

The search report of the first office action for Chinese application No. 201910843603.0, dated Jun. 16, 2021.

* cited by examiner

Fig. 1a

| | | Loudness (dB SPL) | | | | | | |
|---|---|---|---|---|---|---|---|---|
| | | 50 | 55 | 60 | 65 | 70 | 80 | 90 |
| Frequency (Hz) | 125 | 3.25 | 2.13 | 0.09 | 0 | 0 | 0 | 0 |
| | 160 | 3.25 | 2.13 | 0.09 | 0 | 0 | 0 | 0 |
| | 200 | 3.25 | 2.13 | 0.09 | 0 | 0 | 0 | 0 |
| | 250 | 3.25 | 2.13 | 0.09 | 0 | 0 | 0 | 0 |
| | 315 | 3.63 | 2.36 | 0.11 | 0 | 0 | 0 | 0 |
| | 400 | 4.12 | 2.66 | 0.15 | 0 | 0 | 0 | 0 |
| | 500 | 4.7 | 3 | 0.19 | 0 | 0 | 0 | 0 |
| | 630 | 7.57 | 5.97 | 3.29 | 0.59 | 0 | 0 | 0 |
| | 800 | 11.33 | 9.86 | 7.35 | 4.77 | 2.48 | 0 | 0 |
| | 1000 | 15.75 | 14.42 | 12.12 | 9.68 | 7.1 | 1.66 | 0 |
| | 1250 | 17.43 | 16.08 | 13.73 | 11.22 | 8.56 | 2.88 | 0 |
| | 1600 | 19.78 | 18.41 | 15.99 | 13.39 | 10.6 | 4.6 | 0 |
| | 2000 | 22.47 | 21.07 | 18.57 | 15.86 | 12.94 | 6.56 | 0 |
| | 2500 | 23.13 | 21.79 | 19.37 | 16.73 | 13.85 | 7.41 | 0.33 |
| | 3150 | 23.99 | 22.72 | 20.42 | 17.86 | 15.03 | 8.53 | 1.16 |
| | 4000 | 25.6 | 24.5 | 22.49 | 20.2 | 17.6 | 11.44 | 4.19 |
| | 5000 | 24.54 | 23.6 | 21.83 | 19.77 | 17.37 | 11.56 | 4.57 |
| | 6300 | 23.23 | 22.49 | 21.04 | 19.26 | 17.13 | 11.77 | 5.13 |
| | 8000 | 21.82 | 21.32 | 20.24 | 18.82 | 17.03 | 12.29 | 6.18 |

DEEP NEURAL NETWORK BASED AUDIO PROCESSING METHOD, DEVICE AND STORAGE MEDIUM

CROSS REFERENCE

The present application claims priority to Chinese Application No. 201910843603.0 filed on Sep. 6, 2019, the entire content of which is incorporated herein by reference.

TECHNICAL FIELD

The present disclosure relates to audio processing technology, and more particularly, to a deep neural network (DNN) based audio processing method, device and storage medium.

BACKGROUND

Hearing assistance devices (also known as "hearing aids") are widely used in hearing compensation for hearing-impaired patients, which can amplify sounds that are originally inaudible to the hearing-impaired patients. Then with the patients' residual hearing, the sounds can be transmitted to auditory cortex and thus sensed by the patients.

Since different hearing-impaired patients usually have different audiograms or hearing loss diagram (which can reflect different degrees of hearing loss of a patient at different audio frequencies), traditional hearing aids usually amplify audio signals within a specific frequency range based on some frequency compensation algorithms, for example, amplifying the high-frequency audio signals. However, these traditional hearing compensation algorithms are unable to distinguish between human speeches and background noises, and therefore noises may be amplified together with human speeches within the amplified hearing-aid frequency range, which may impact the reception and recognition of human speeches.

Thus, there is a need for an improved audio processing method.

SUMMARY

An objective of the present disclosure is to provide a DNN-based audio processing method, device and storage medium.

According to one aspect of the present disclosure, a deep neural network based audio processing method is provided. The audio processing method comprises: obtaining a DNN-based speech extraction model, wherein the speech extraction model is created through the following steps: obtaining a mixed audio training dataset having multiple mixed audio data frames each containing mixed speech data and non-speech data, the speech data and the non-speech data both being represented in time domain data format; acquiring at least one audiogram and at least one set of predetermined gain compensation coefficients associated with the at least one audiogram, wherein each audiogram corresponds to a set of predetermined gain compensation coefficients, and each set of predetermined gain compensation coefficients include multiple predetermined gain compensation coefficients corresponding to respective audio signal frequencies; performing, for each of the mixed audio data frames, gain compensation on the speech data included therein with the at least one set of predetermined gain compensation coefficients to generate compensated speech data; and training the DNN-based speech extraction model with the mixed audio training dataset and the compensated speech data corresponding to each of the mixed audio data frames of the mixed audio training dataset to obtain a trained speech extraction model; receiving an audio input object having a speech portion and a non-speech portion, wherein the audio input object includes one or more audio data frames each having a set of audio data samples sampled at a predetermined sampling interval and represented in time domain data format; obtaining a user audiogram and a set of user gain compensation coefficients associated with the user audiogram; and inputting the audio input object and the set of user gain compensation coefficients into the trained speech extraction model to obtain an audio output result represented in time domain data format outputted by the trained speech extraction model, wherein the non-speech portion of the audio input object is at least partially attenuated in or removed from the audio output result.

According to another aspect of the present disclosure, a DNN-based audio processing device is provided. The audio processing device comprises a non-transitory computer storage medium for storing one or more executable instructions that, when executed by a processor, causes the processor to perform the processing steps of the above aspect.

According to another aspect of the present disclosure, a non-transitory computer storage medium is provided. The non-transitory computer storage medium has stored therein one or more executable instructions that, when executed by a processor, causes the processor to perform the processing steps of the above aspect.

The foregoing is a summary of the present application, and may be simplified, generalized or omitted in detail. Thus, it should be appreciated by those skilled in the art that this part is only exemplary and illustrative, but not intend to limit the scope of the present application in any ways. This summary part is neither intend to determine the key feature or necessary feature of the subject sought to be protected, nor intend to be used as a supplementary method for determining the scope of the subject sought to be protected.

BRIEF DESCRIPTION OF THE DRAWINGS

The foregoing and other features of the present application will be more fully understood from the following description and the appended claims taken in conjunction with the accompanying drawings. It is to be understood that these accompanying drawings merely illustrate certain embodiments in accordance with the present disclosure and should not be considered as limiting the scope of the present application. The present disclosure will be illustrated more clearly and in more detail with the accompanying drawings.

DETAILED DESCRIPTION

The following detailed description refers to the accompanying drawings as a part of the present disclosure. In the figures, similar symbols generally represent similar components unless otherwise stated in the context. The illustrative embodiments described in the detailed description, the accompanying drawings and the claims are not limiting. Other embodiments may be adopted, or modifications may be made without deviation from the spirit and the subject of the disclosure. It can be understood that, the various aspects of the disclosure described and graphically presented herein may be arranged, replaced, combined, divided and designed in many different configurations, and these different configurations are implicitly included in the disclosure.

Figure 1A:
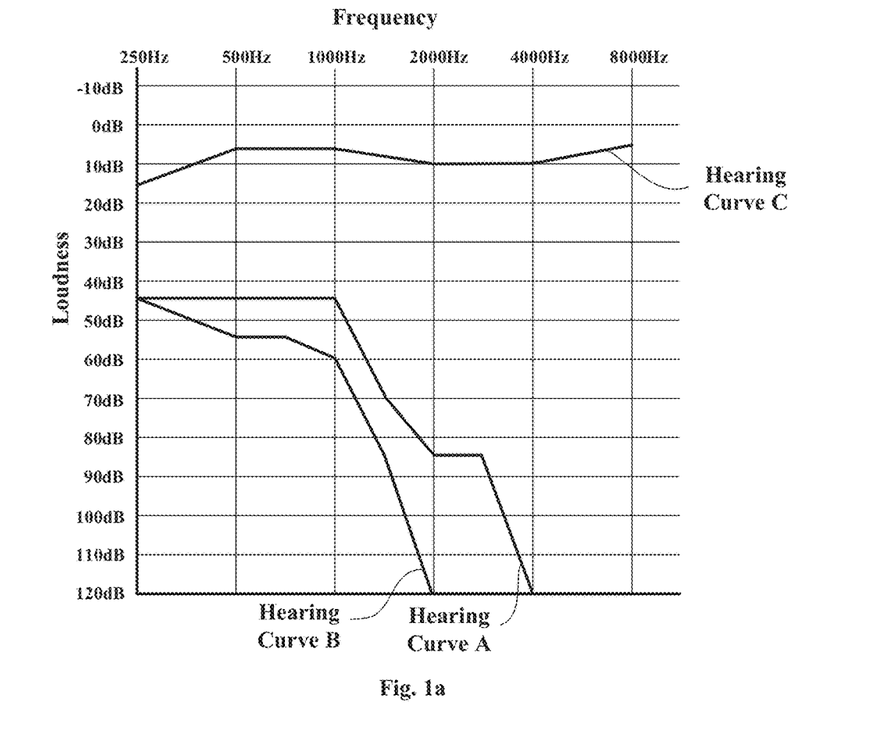
FIG. 1a shows an exemplary audiogram according to an embodiment of the present application.

FIG. 1*a* shows an exemplary audiogram according to an embodiment of the present application. It can be understood that, different hearing-impaired patients may have different audiograms.

As shown in FIG. 1*a*, an audiometric curve C represents an audiometric curve of a normal human ear. In an audio signal frequency range from 250 Hz to 8000 Hz, sounds having a loudness generally above 15 dB SPL are audible. Audiometric curves A and B represent audiometric curves of hearing-impaired patient(s), for example, audiometric curves of a patient's left ear and right ear. It can be seen that, compared with the normal audiometric curve C, these two audiometric curves A and B have significant hearing losses. For example, for the audiometric curve A: when the sound frequency is below 1000 Hz, only sounds having a loudness above 45 dB SPL are audible; in the frequency range from 2000 Hz to 3000 Hz, only sounds having a loudness above about 85 dB SPL are audible; and when the frequency is above 4000 Hz, even sounds having a loudness of 120 dB SPL are not audible. Similarly, for the audiometric curve B, the hearing loss is more serious than the audiometric curve A: for the higher frequency range above 2000 Hz, even sounds having a loudness of 120 dB SPL are not audible. In some embodiments, an amplification gain required for compensating an abnormal audiometric curve to the normal audiometric curve (for example, after compensation sounds having a minimum loudness of 20 dB SPL are audible) corresponds to the hearing loss. For example, for the curve A, in the frequency range from 250 Hz to 1000 Hz, the hearing loss is about (45-20) dB SPL=25 dB SPL.

It can be seen from the audiogram shown in FIG. 1*a* that, for a hearing-impaired patient, his or her hearing tends to have different hearing losses at different audio signal frequencies, therefore it is required to provide frequency-based varying hearing compensations. For example, for the audiometric curves A and B, sounds can be amplified by a small amount in the low frequency band (e.g. frequencies lower than 1000 Hz), while amplified by a larger amount in the high frequency bands (e.g. frequencies greater than 1000 Hz) so as to compensate for the more significant hearing loss in the high frequency range.

Since the purpose of hearing compensation is to compensate for the hearing loss that allows a hearing impaired patient to sense external sounds ideally, it is often desirable that the loudness of the compensated and processed sounds are within a certain loudness range, i.e., the loudness is neither too small nor too large. Accordingly, in some embodiments, sounds with different loudness are expected to be amplified or attenuated by different gain compensation coefficients. For example, in the frequency range of 100 Hz to 200 Hz, sounds having a loudness of 30 to 90 dB SPL can be amplified by a small amount, sounds having a loudness of 90 to 120 dB SPL can be attenuated by a small amount, and sounds having a loudness of 120 dB SPL can be limited. In this way, it can be ensured that the processed sounds are not too loud while the purpose of sound compensation is achieved. In other words, it is preferable that the frequency gain compensation for hearing loss can change with the loudness of sounds.

Various known algorithms can be used to determine different compensation gain values corresponding to different loudness at different frequencies in an audiogram. In some embodiments, a Wide Dynamic Range Compression (WDRC) algorithm may be used to determine the compensation gain values. The WDRC algorithm may have different mapping formulas to determine the compensation gain values, such as the NAL-NL2 mapping formula for nonlinear amplification released by the Australian National Acoustic Laboratory in 2012 (see https://www.ncbi.nlm.nih.gov/pmc/articles/PMC4627149/).

Figure 1B:
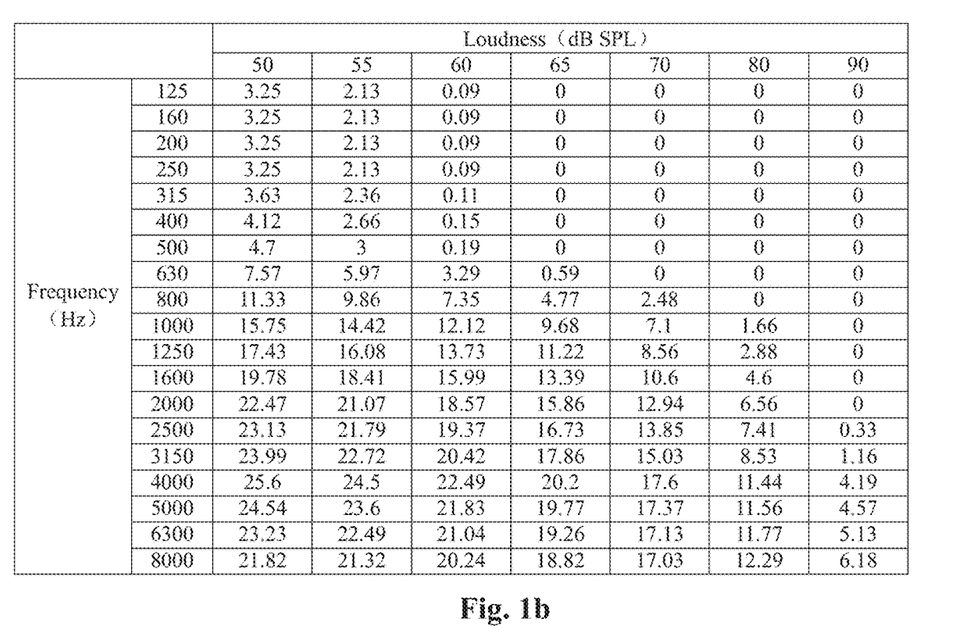
FIG. 1b shows a set of gain coefficients corresponding to an audiometric curve in the audiogram shown in FIG. 1a according to an embodiment of the present application.

FIG. 1*b* shows a set of gain compensation coefficients corresponding to the audiometric curve B in the audiogram shown in FIG. 1*a* according to an embodiment of the present application.

As shown in FIG. 1*b*, each row represents gain compensation coefficients for an audio signal frequency, while each column represents gain compensation coefficients for a loudness. Accordingly, the set of gain compensation coefficients can be represented as a two-dimensional gain coefficient matrix indexed with audio frequency and loudness. For example, in the first column, the frequency is 125 Hz: when the loudness of the input audio signal is 50 dB SPL, the audio input signal can be amplified by 3.25 dB; when the loudness of the input audio signal is 80 dB SPL, the audio input signal may not be amplified. As another example, in the tenth column, the frequency is 1000 Hz: when the loudness of the input audio signal is 50 dB SPL, the input audio signal can be amplified by 15.75 dB; when the loudness of the input audio signal is 80 dB SPL, the input audio signal can be amplified by 1.66 dB. Similar processing can be applied for other frequencies and would not be repeated herein.

It can be understood that the hearing loss compensation method shown in FIG. 1*b* can compensate for hearing loss of a hearing-impaired patient, but it is still unable to distinguish between the speech signals and background noises at the same frequency. In order to solve this problem, the inventors of the present application creatively combined the deep neural network (DNN) technology with the above hearing loss compensation method. By designing a specific audio training dataset to train a DNN model, the trained DNN model can adaptively perform gain compensation based on the audio input object, and can amplify the speech signal while suppressing background noise mixed within the audio input object.

Figure 2A:
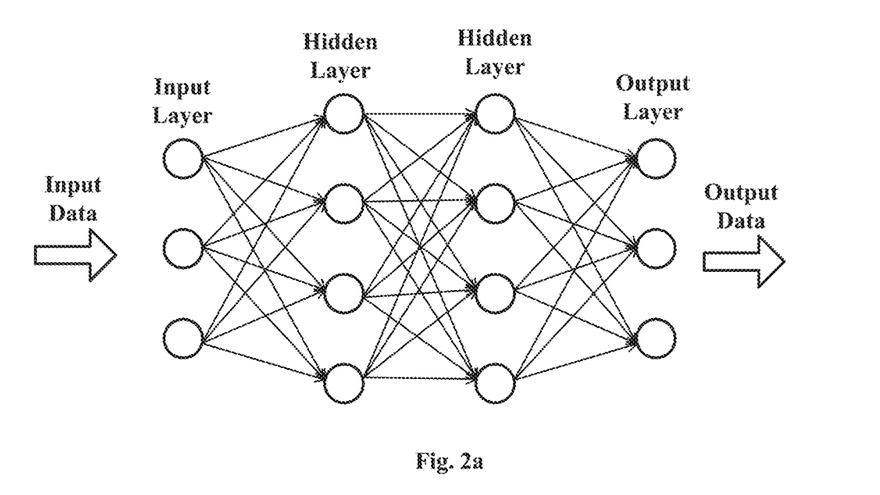
FIG. 2a shows an example of a speech extraction model according to an embodiment of the present application.

FIG. 2*a* shows an example of a speech extraction model according to an embodiment of the present application.

As shown in FIG. 2*a*, the speech extraction model uses a fully-connected neural network structure, which includes an input layer, multiple hidden layers (processing sublayers, only two hidden layers are exemplarily shown in FIG. 2*a*, but in other embodiments, more hidden layers may be included) and an output layer. After being trained with specific training dataset(s), the speech extraction model may have a weighting coefficient set and an offset coefficient set, so that each hidden layer may use at least one set of weighting coefficients included in the weighting coefficient set and/or one set of offset coefficients included in the offset coefficient set to weight the received data. Taken as a whole, the data received by the input layer of the neural network (audio input object) can be converted into the data output by the output layer (audio output result) accordingly.

In some embodiments, the input layer at least includes a first plurality of neurons for receiving the audio input object, and the output layer includes a second plurality of neurons for outputting the audio output result. Preferably, a number of the first plurality of neurons may be equal to a number of the second plurality of neurons. That is, the number of the sets of audio data included in each audio data frame of the audio input object is equal to the number of the sets of audio data included in each processed audio data frame of the audio output result. In other words, the data format of the audio input object and the data format of the audio output result are the same, i.e., an end-to-end processing is realized. This end-to-end processing can improve the compatibility and efficiency of audio processing. It can be understood that the input layer may further include a third plurality of neurons for receiving a set of user gain compensation coefficients.

Figure 2B:
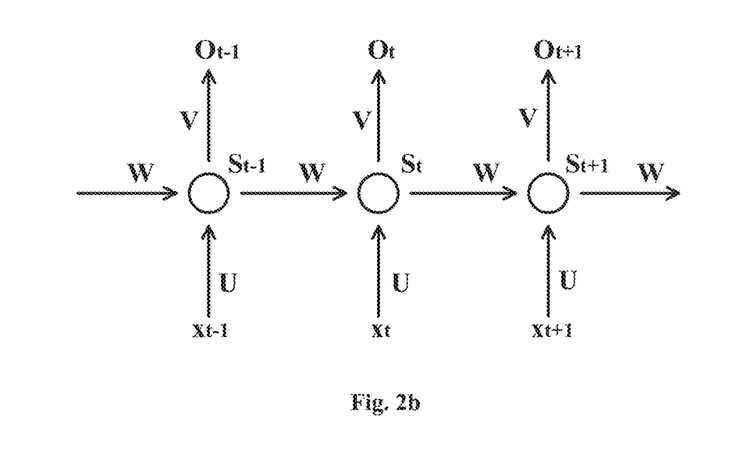
FIG. 2b shows an example of a speech extraction model according to another embodiment of the present application.

FIG. 2b shows an example of a speech extraction model according to another embodiment of the present application As shown in FIG. 2b, the speech extraction model uses a recurrent neural network structure, and FIG. 2b shows a hierarchical expansion of a hidden layer in the recurrent neural network. The hidden layer is connected between an input layer and an output layer. Inputs at different time steps correspond to different outputs, and the values of the hidden layer at a last time step may affect the output at the current time step. Specifically, t−1, t, t+1 represent a time series; X represents input data; St represents the memory of the sample at time step t, that is, the value of the hidden layer at time step t, which can be expressed as $S_t=f(W*S_{t-1}+U*X_t)$. U is the weight of the output layer to the hidden layer, W is the weight of the hidden layer at the last time step as the input at the current time step, V is the weight of the hidden layer to the output layer, o is the output data, and f(x) is the activation function.

Similar to the example of the fully-connected neural network shown in FIG. 2a, after being trained with specific training dataset(s), the trained speech extraction model may have a weighting coefficient set and an offset coefficient set, so that each hidden layer may weight the received data with at least one set of weighting coefficients included in the weighting coefficient set and/or one set of offset coefficients included in the offset coefficient set.

In some embodiments, the recurrent neural network model may include multiple processing layers (hidden layers), for example, including at least one Gated Recurrent Unit (GRU) processing sublayer or Long Short Time Memory network (LSTM) processing sublayer.

Figure 3:
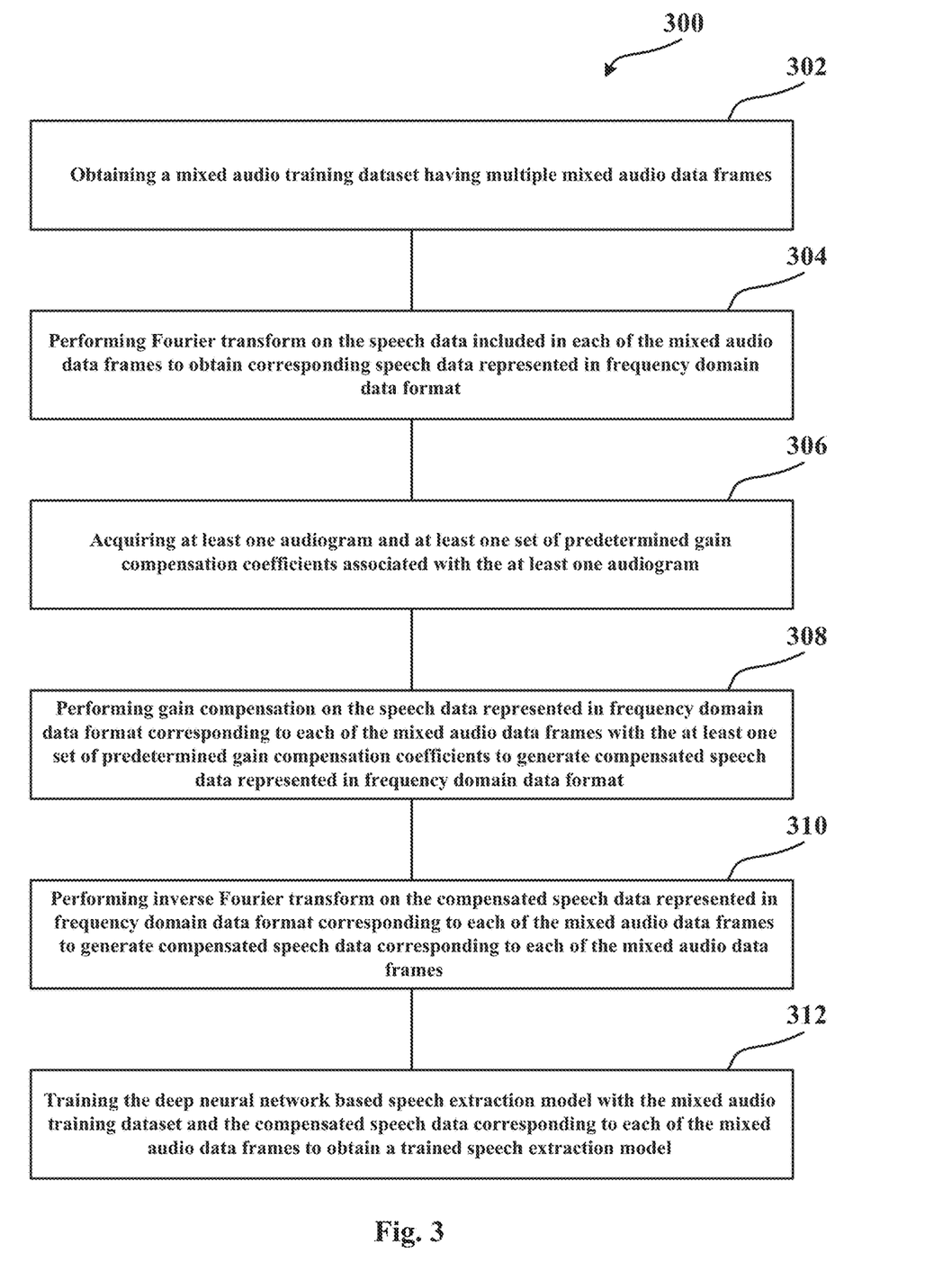
FIG. 3 shows a method for creating a DNN-based speech extraction model according to an embodiment of the present application.

FIG. 3 shows a method for creating a DNN-based speech extraction model according to an embodiment of the present application. The created speech extraction model can be used for processing subsequent audio input objects, that is, for extracting and selectively amplifying/attenuating speech signals contained therein. The speech extraction model may use the neural network model shown in FIG. 2a or 2b, or any other suitable DNN models.

The method of the embodiment of the present application designs special training data, and uses such training data to train a DNN-based speech extraction model.

Specifically, before training the speech extraction model, in the embodiment of the present application a training dataset mixed with speech data and non-speech data is constructed, which can simulate speech data in an actual noisy environment. In the embodiment, another dataset with speech data in the training dataset compensated is further constructed, which can simulate the extracted and amplified/attenuated speech data. For the speech extraction model, the data in these two datasets are known data, and in addition, the audiogram and its corresponding gain compensation coefficients are also known data. In this way, the speech extraction model can be trained with these known data, so that the trained speech extraction model can similarly process subsequent unknown audio data (which includes speech data and non-speech data) to selectively extract and compensate for speech data.

As shown in FIG. 3, the method 300 starts at step 302, a mixed audio training dataset is obtained. The mixed audio training dataset includes multiple mixed audio data frames, where each mixed audio data frame includes speech data and non-speech data which are mixed at a predetermined gain ratio, and the speech data and the non-speech data are both represented in the time domain data format.

In some embodiments, each mixed audio data frame may have a predetermined frame length (for example, 1 to 50 milliseconds, preferably 10 milliseconds), and include a plurality of sampling data points that are chronologically distributed over the predetermined frame length. These sampling data points may be obtained by sampling with a predetermined sampling frequency (for example, not smaller than 10 kHz). Since each mixed audio data frame includes speech data and non-speech data that are mixed at a predetermined gain ratio, each sampling data point generally includes a speech data portion and a non-speech data portion. The speech data portion may be obtained by sampling a predetermined speech signal (pure human speech, such as phonemes in a specific language), while the non-speech data portion may be obtained by sampling a predetermined background noise signal. The predetermined speech signal may be, for example, speech signals generated by persons of different genders, ages, nationalities, physiological status, native languages uttering in the context of speech reading, daily conversation, humming, singing, yelling etc.; while the predetermined background noise signal can be a background noise signal generated by a transportation vehicle, wind, water, animals, machine operation, or in an indoor environment(such as home, office, construction site, classroom etc.) or an outdoor environment, etc. The speech data portion and the non-speech data portion may be mixed at a predetermined gain ratio, which, for example, equals to 1, or is greater than or less than 1. In some embodiments, the non-speech data portion may include multiple predetermined background noise signals, and these predetermined background noise signals are mixed with the predetermined speech signal at corresponding predetermined gain ratios, respectively. It can be understood that the more sources or types of mixed speech data and non-speech data in the mixed audio data frame, the richer the training data in the mixed audio training dataset is, which is beneficial for the subsequent training of the DNN model.

In some embodiments, each mixed audio data frame X can be represented by Equation (1):

$$X=Y+Z \qquad \text{Equation (1)}$$

The speech data Y in Equation (1) can be represented by Equation (2):

$$Y = \{y_0, y_1 \ldots y_i \ldots y_{N-1}\} \quad \text{Equation (2)}$$

$y_i$ represents the $i^{th}$ speech data point; i is a value from 0 to N−1; N is a natural number, and N indicates the number of the speech data points included in a frame of speech data Y. In some embodiments, both the speech data and the non-speech data may be processed with a predetermined gain, for example, being amplified or attenuated. In some other embodiments, the speech data or non-speech data may not be processed with a predetermined gain, but only combined with each other.

The non-speech data Z in Equation (1) can be represented by Equation (3):

$$Z = \{\Sigma_{j=1}^{m} a_j z_{j,0}, \Sigma_{j=1}^{m} a_j z_{j,1} \ldots \Sigma_{j=1}^{m} a_j z_{j,i} \ldots \Sigma_{j=1}^{m} a_j z_{j,N-1}\} \quad \text{Equation (3)}$$

$\Sigma_{j=1}^{m} a_j z_{j,i}$ represents the $i^{th}$ non-speech data point in the mixed audio data frame, which is generally sampled simultaneously with the $i^{th}$ speech data point, and the $i^{th}$ non-speech data point may include a combination of m predetermined background noise signals mixed with the speech data point $y_i$ at a predetermined gain ratio $a_j$, respectively, where m may be a natural number. In some embodiments, m may be equal to 1, that is, each speech data point is mixed with a non-speech data point. In some other embodiments, m may be greater than 1, that is, each speech data point is mixed with multiple non-speech data points, and the multiple non-speech data points can be mixed with the speech data point using the same or different predetermined gain ratios. In some embodiments, the predetermined gain ratio may be equal to 1, greater than 1 (amplification), or less than 1 (attenuation).

It should be noted that, it is assumed herein that each mixed audio data frame is a short-term stable signal which does not change significantly over the frame length. In some embodiments, multiple mixed audio data frames may be partially overlapped with each other, and the partially overlapped multiple mixed audio data frames may be obtained by framing the mixed signal with a sliding window.

It can be seen that, by selecting the non-speech data and the speech data which are mixed with different gain ratios, the mixed audio training dataset can include suitable samples to simulate the environment in real life and speech objects to be extracted, which is very beneficial for subsequently training the neural networks. It should be noted that both the audio data and gain ratio in the mixed audio training dataset are known data.

In step 304, Fourier transform is performed on the speech data in each mixed audio data frame to obtain corresponding speech data represented in frequency domain data format.

Since it is desired to perform frequency compensation on the speech data, in step 304, the speech data is converted into speech data $S = \{S_0, S_1, \ldots S_k \ldots S_{N-1}\}$ represented in frequency domain data format using Fourier transform, as shown in Equation (4).

$$S_k = \sum_{n=0}^{N-1} y_n * e^{-\frac{i 2\pi k n}{N}}, k = 0, \ldots, N-1 \quad \text{Equation (4)}$$

N is a number of the data sampling points included in each mixed audio data frame; $S_k$ represents an energy of the speech data at the corresponding frequency $$\frac{N}{k} * f_s,$$

where $f_s$ is the sampling frequency.

After determining the mixed audio training dataset, it is desired to further determine the compensation result of the speech data in the mixed audio training dataset. The compensation result may include amplified speech data based on the hearing loss of the hearing-impaired patient to compensate for his or her hearing loss. Steps 306 to 310 shown in FIG. 3 are used for selective compensation of the speech data.

Specifically, in step 306, at least one audiogram and at least one set of predetermined gain compensation coefficients associated with the at least one audiogram are acquired, wherein each audiogram corresponds to a set of predetermined gain compensation coefficients, and each set of predetermined gain compensation coefficients includes multiple predetermined gain compensation coefficients corresponding to respective audio signal frequencies.

An example of the audiogram is shown in FIG. 1a, which includes hearings or hearing losses at different frequencies. In some embodiments, these audiograms or audiometric curves can be randomly generated. For example, 8 to 9 audio signal frequencies are selected, and for each frequency, a value can be randomly selected from 0 to 120 dB SPL, therefore 8 to 9 pieces of hearing data associated with the respective 8 to 9 audio signal frequencies are obtained. It can be understood that, in some embodiments, the audiograms may not be randomly generated but are selected from audiograms of some representative hearing-impaired patients. In some embodiments, for example, 1, 5, 10, 15, 20, 30, 50, 100, 500, 1000 or other numbers of audiograms can be obtained through random generation or designation, and each audiogram corresponds to a set of predetermined gain compensation coefficients. It can be understood that, the greater the number of audiograms, the more data can be used for training. In addition, in the case that the audiograms are randomly generated, the greater the number of audiograms is, and accordingly better matching with actual users' audiograms in subsequent speech extraction can be expected.

Similar to the gain coefficients shown in FIG. 1b, various existing frequency compensation algorithms can be utilized to generate a set of predetermined gain compensation coefficients based on each audiogram. In some embodiments, at least one gain compensation coefficient may be respectively generated for each audio signal frequency within the range of an audiogram, so as to obtain a set of gain weighting coefficients corresponding to the audiogram. In some embodiments, the set of gain compensation coefficients may include one or more corresponding gain compensation coefficients for each audio signal frequency, and each of which corresponds to a loudness. FIG. 1b shows an example of such gain compensation coefficients.

Preferably, the WDRC algorithm may be used to determine a set of gain compensation coefficients corresponding to an audiogram. The WDRC can generate multiple gain compensation coefficients that vary with loudness for at least a part of the audio signal frequencies, which can make the sound, when compensated, not too loud, so that the patient can feel better during use.

It can be understood that the above-mentioned audio signal frequencies should correspond to the audio signal frequencies of the speech data obtained in step 304 represented in frequency domain data format. In other words, each frequency point of the speech data S represented in frequency domain data format should have a corresponding gain compensation coefficient. Generally speaking, the audiogram itself can only have a small amount of frequency points. For example, the audiogram shown in FIG. 1$a$ only includes 6 frequency points, and the set of gain compensation coefficients shown in FIG. 1$b$ only correspond to 19 frequency points. Therefore, in some embodiments, the gain compensation coefficient $W=\{W_0, \ldots W_k \ldots, W_{N-1}\}$ corresponding to the spectral distribution of the speech data S can be obtained through interpolation algorithm. For example, each gain compensation coefficient can be determined by the linear interpolation algorithm of Equation (5).

$$W_k = w(f_1) + \frac{w(f_2) - w(f_1)}{f_2 - f_1} * (f(k) - f_1) \quad \text{Equation (5)}$$

$W_k$ denotes the gain compensation coefficient at frequency $f(k)$ of $S_k$; $w(f_1)$ denotes the gain compensation coefficient at frequency $f_1$ in the audiogram; and $w(f_2)$ denotes the required gain compensation coefficient at frequency $f_2$ in the audiogram.

Equation (5) represents the interpolation algorithm of the gain compensation coefficient under the same loudness. For the case that the gain compensation coefficients are different under different loudness, a similar interpolation calculation can be performed for the gain compensation coefficients under each loudness. It can be understood that the set of gain compensation coefficients obtained through interpolation can be represented as a two-dimensional gain coefficient matrix indexed by frequency and loudness of the audio signal. It should be noted that, in other embodiments, the gain compensation coefficients may also be calculated by other interpolation algorithms, such as the $n^{th}$ polynomial interpolation or other nonlinear interpolation algorithms.

Next, in step 308, at least one set of predetermined gain compensation coefficients is used to perform gain compensation on the speech data represented in frequency domain data format corresponding to each mixed audio data frame, thereby generating compensated speech data represented in frequency domain data format.

Specifically, the compensated speech data represented in frequency domain data format is $H=\{H_0, \ldots H_k \ldots, H_{N-1}\}$, and each speech data $H_k$ can be calculated by Equation (6).

$$H_k = W_k * S_k, \text{ where } k=0, \ldots, N-1 \quad \text{Equation (6)}$$

It can be understood that for the case that different loudness corresponds to different gain compensation coefficients, each speech data $S_k$ also includes loudness information. Accordingly, the gain compensation coefficient corresponding to such loudness information can be selected for compensating the speech data $S_k$.

In step 310, inverse Fourier transform is performed on the compensated speech data represented in frequency domain data format corresponding to each mixed audio data frame, thereby generating compensated speech data corresponding to each mixed audio data frame, where all the compensated speech data is represented in time domain data format.

Specifically, the compensated speech data represented in time domain data format is $T=\{T_0, \ldots T_n \ldots, T_{N-1}\}$, where each speech data $T_n$ can be represented by Equation (7):

$$T_n = \sum_{k=0}^{N-1} H_k * e^{\frac{i2\pi kn}{N}}, n = 0, \ldots, N-1 \quad \text{Equation (7)}$$

After the above steps 306 to 310, the speech data in each mixed audio data frame can be compensated with the required gain compensation coefficients.

Next, in step 312, the DNN-based speech extraction model is trained using the mixed audio training dataset and the compensated speech data corresponding to each mixed audio data frame, to obtain a trained speech extraction model.

In some embodiments, the speech extraction model may be a recurrent neural network model. The recurrent neural network is good at processing sequence data since it can remember previous information and use such information in the calculation of current output results. In theory, the recurrent neural network can process sequence data of any length.

In some embodiments, the speech extraction model is trained by the following manner. The mixed audio training dataset and at least one set of predetermined gain compensation coefficients associated with at least one audiogram can be used as input to the input layer of the speech extraction model, and the compensated speech data corresponding to each mixed audio data frame in the mixed audio training dataset can be used as output to the output layer in the speech extraction model. In this way, the trained speech extraction model can have a weighting coefficient set and an offset coefficient set associated with each other.

In some embodiments, the Error Back Propagation algorithm or other existing training algorithms for neural network may be used to train the speech extraction model. In the training process with the Error Back Propagation algorithm, for each training sample, the model may first initialize random weighting coefficients, bias coefficients and threshold parameters, receives a relevant known input example (mixed audio data frame X represented by Equation (1)) to the input layer neurons, and forward propagates data processed by the input layer via various layers (input layer→hidden layer→output layer) until the output layer generates an output value. Then, according to the error between the output value generated through calculation and the known output value (Equation (7) represents the compensated speech data T represented in time domain data format), the error is propagated back to the neurons of the hidden layer, and finally, the weighted coefficient of the connection and the threshold of the neurons are adjusted according to the error calculated by the hidden layer neurons. The Error Back Propagation algorithm can repeatedly iterate and execute the above steps until the condition for ending the training is reached.

Figure 4:
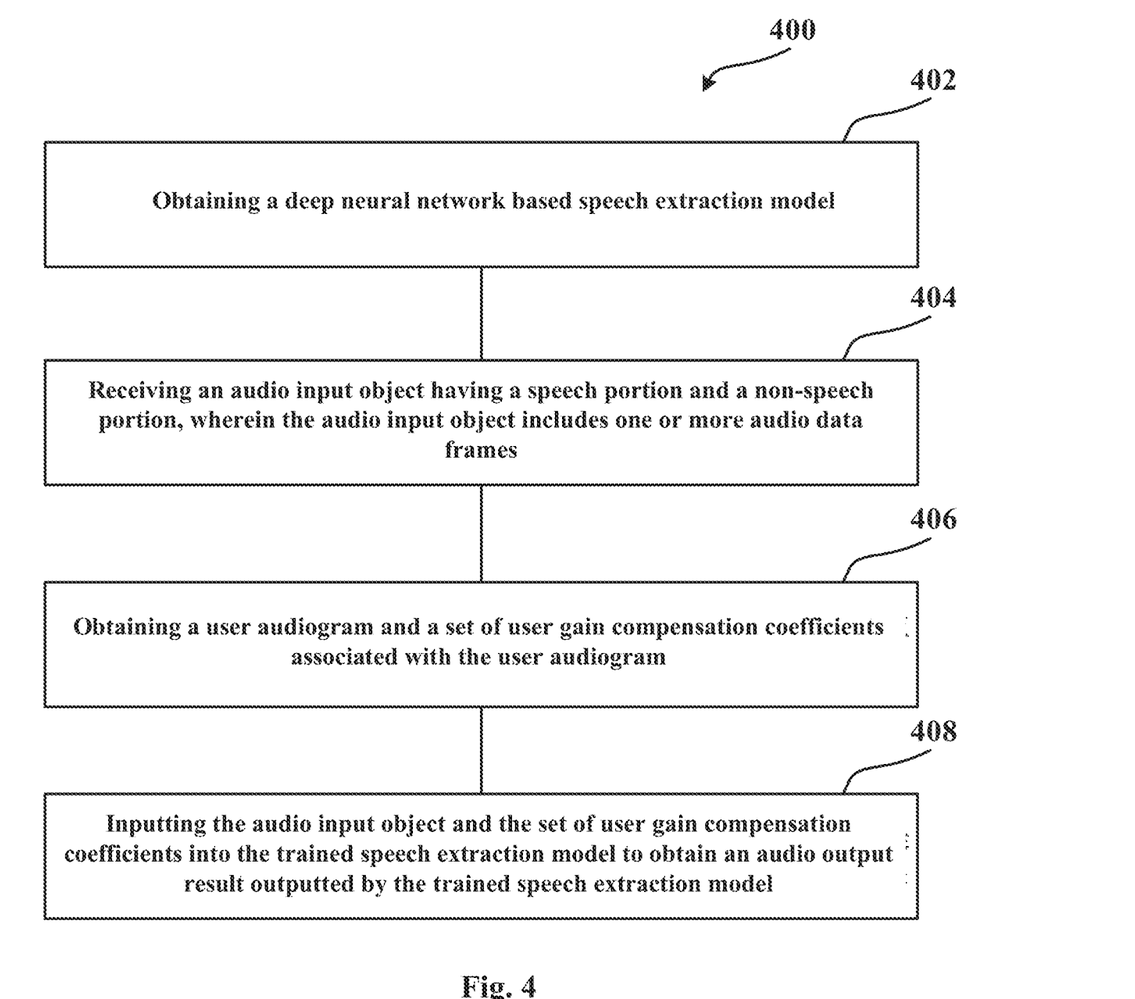
FIG. 4 shows a DNN-based audio processing method according to an embodiment of the present application.

FIG. 4 shows a DNN-based audio processing method 400 according to an embodiment of the present application.

As shown in FIG. 4, in step 402, a DNN-based speech extraction model is obtained. In some embodiments, the speech extraction model may be a speech extraction model trained with specific training data created by the embodiment shown in FIG. 3.

In step 404, an audio input object having a speech portion and a non-speech portion is received. The audio input object includes one or more audio data frames, and each of these audio data frames has a set of audio samples sampled at a predetermined sampling interval, where the audio data is represented in time domain data format.

In step 406, a user audiogram and a set of user gain compensation coefficients associated with the user audiogram are obtained. As mentioned above, audiograms of hearing-impaired patients generally differ from patient to patient, so the user audiogram is, for example, an audiogram of an patient himself wearing a hearing aid incorporating the DNN-based speech extraction model. Next, the set of user gain compensation coefficients associated with the user's audiogram can be determined in a manner similar to step 306 in FIG. 3.

Next, in step 408, the audio input object and the set of user gain compensation coefficients are input to the trained speech extraction model, thereby an audio output result output by the trained speech extraction model can be obtained, where the audio output result is represented in time domain data format. Compared with the audio input object, the non-speech portion of the audio input object is at least partially attenuated or removed from the audio output result.

In some embodiments, the trained speech extraction model obtained in step 402 may be a user-customized speech extraction model. In other words, when creating training data, for example, in step 306 of the embodiment shown in FIG. 3, the acquired at least one audiogram at least includes a user audiogram of a specific user which is used to generate the compensated mixed audio training dataset, so that this mixed audio training dataset can be used to train a neural network model for the user. The training of the model can be performed, for example, when the hearing aid initializes its settings.

In some embodiments, the frame length of each audio data frame of the audio input object is from 1 to 50 milliseconds, and the sampling frequency is not less than 10 kHz. Audio data frames can be obtained through collection by a sound collection device (for example, a microphone) and conversion by an analog-to-digital conversion device. It can be understood that the audio output result obtained in step 408 can be converted into an analog signal by a digital-to-analog conversion device.

Figure 5A:
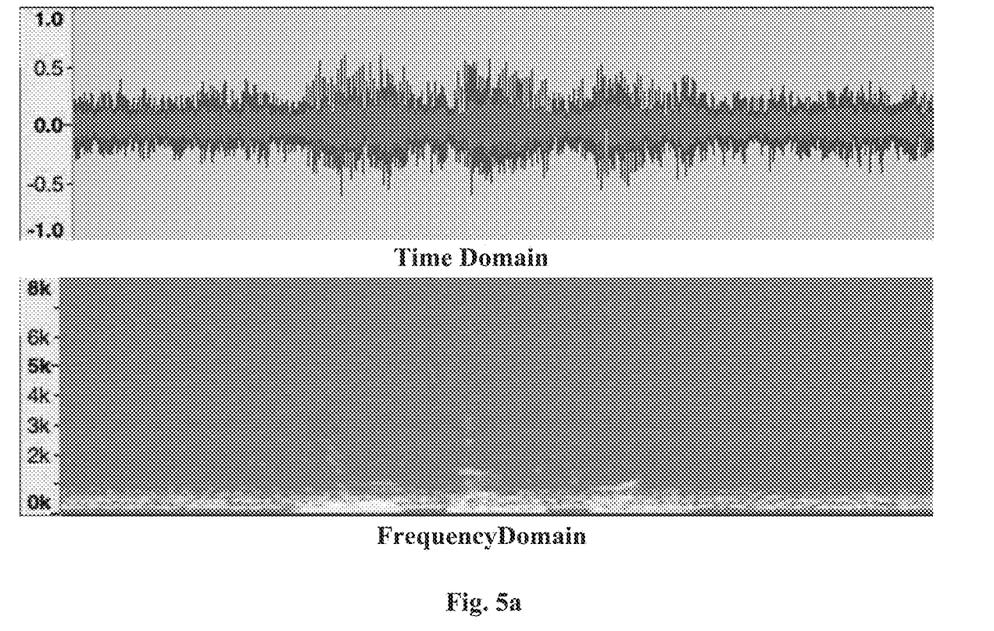
FIG. 5a shows an exemplary mixed audio signal having speech signal and non-speech signal.
Figure 5B:
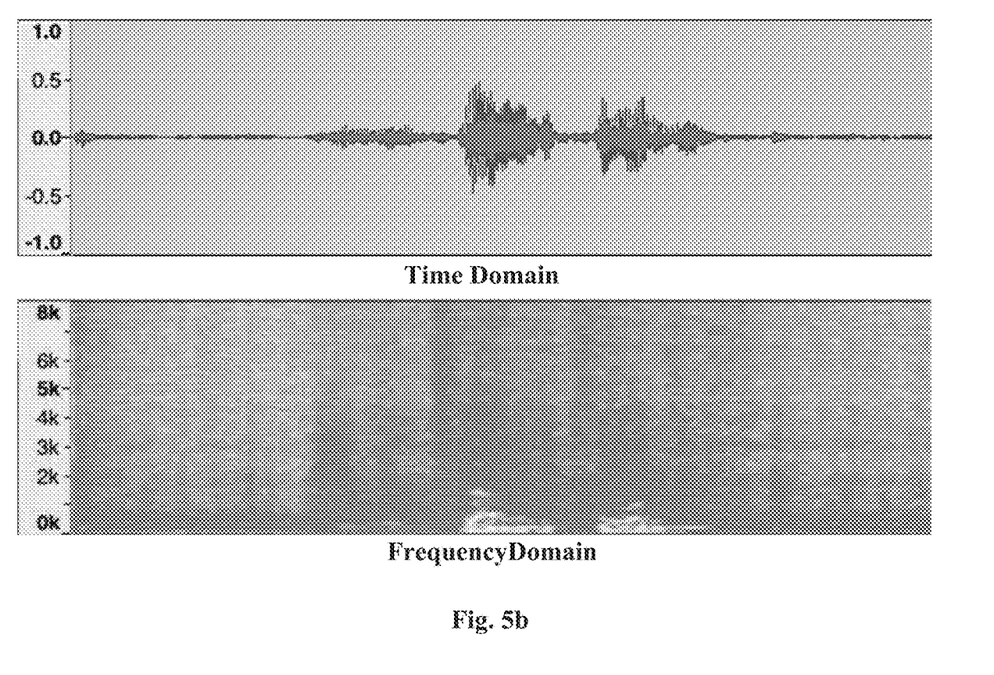
FIGS. 5*b* and 5*c* show processing results of the exemplary audio signal shown in FIG. 5*a* using existing audio processing methods.
Figure 5C:
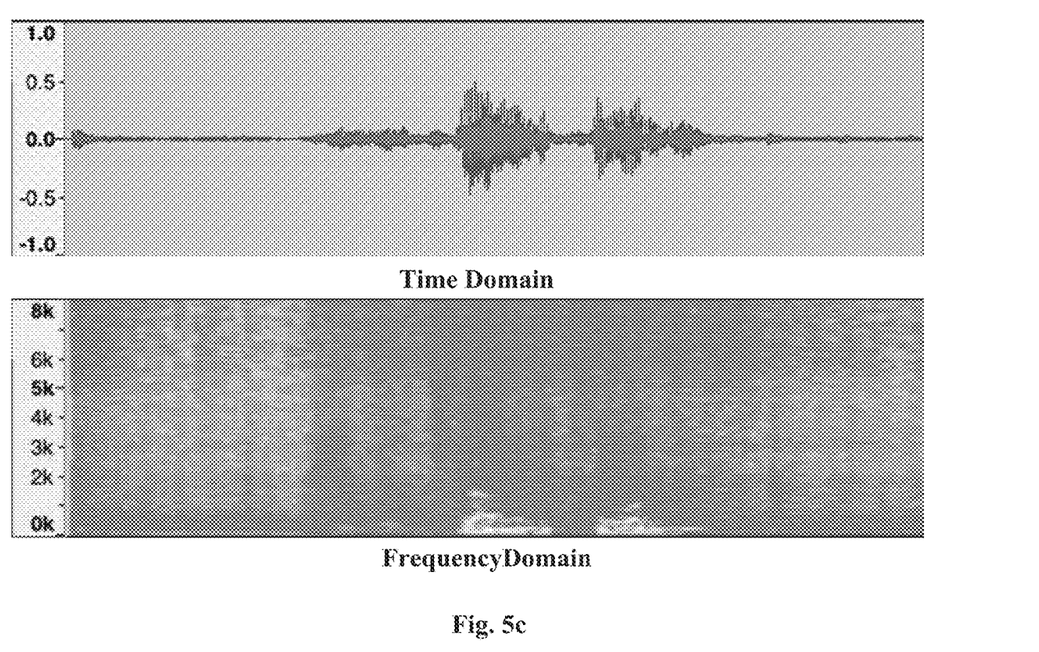
Figure 5D:
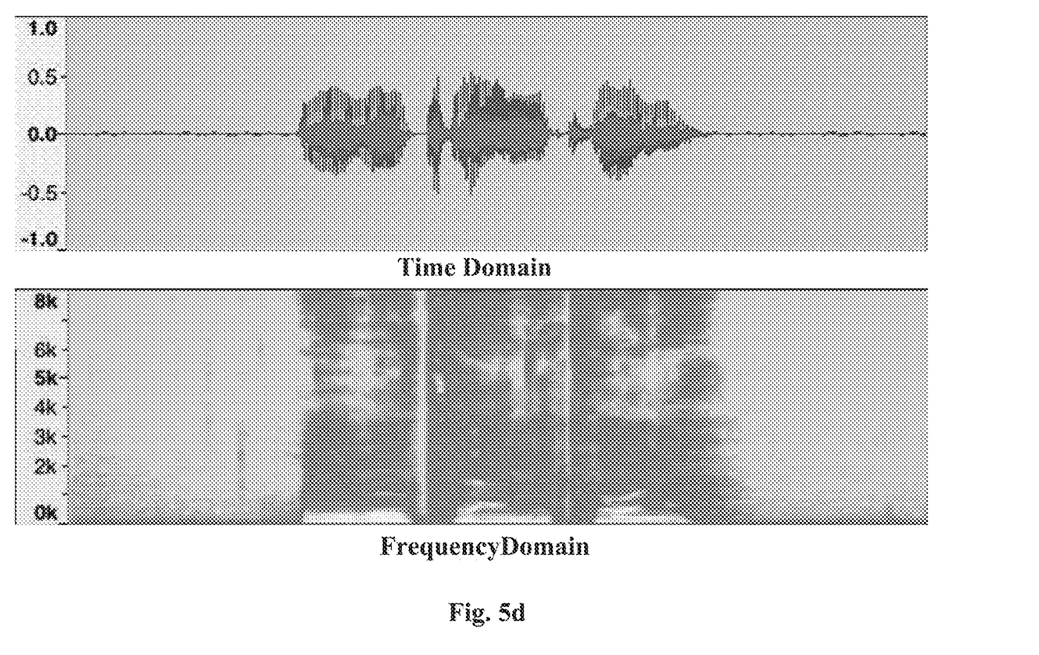
FIG. 5*d* shows a processing result of the exemplary audio signal shown in FIG. 5*a* using the audio processing method in accordance with an embodiment of the present application.

FIG. 5a shows an exemplary audio signal mixed with speech signal and non-speech signal; FIGS. 5b and 5c show results output by using existing audio processing methods to process the exemplary audio signal shown in FIG. 5a; FIG. 5d shows a result output by using the audio processing method in accordance with embodiments of the present application to process the exemplary audio signal shown in FIG. 5a.

Specifically, FIG. 5b is an audio signal obtained after only performing an existing speech enhancement process on the exemplary audio signal. It can be seen that the speech signals are effectively extracted, but in the high frequency range, the extracted speech signals have a relatively low loudness. For the hearing-impaired patient represented by the hearing curve B or C of FIG. 1a, the improved signal still cannot meet his or her hearing needs.

FIG. 5c is an audio signal obtained after performing an existing audio enhancement processing and a further frequency compensation on the exemplary audio signal. It can be seen that the speech signals in high-frequency range are amplified, which meet the hearing needs of hearing impaired patients. However, it is noted that signals in the high-frequency range are generally all amplified, which results in that when there is no human speech (such as at the start time in the figure), high-frequency background noises are still amplified, which significantly affects the hearing experience of hearing impaired patients.

Further see FIG. 5d, it can be seen that the audio processing method of the embodiment of the present application can not only effectively separate human speech and background noise, but also suppress background noises at the same frequency as human speeches. For example, when there is no human speech (such as at the start time in the figure), generally no noise signal is amplified.

The audio processing method of the present application may be used for various audio devices, and is implemented as an audio processing apparatus coupled to an audio device or integrated in an audio device. The audio device is, for example, a hearing aid device or an earphone, a mobile communication terminal, and other electronic devices with audio collection and/or audio output functions.

It should be noted that, in the present application, the mixed audio training dataset is designed/processed as regarding speech data as data or signals to be extracted. In some other embodiments, if the signal extracted from the audio signal mixed with background noise is expected to be other types of data/signals, such as musical instrument sounds, animal sounds or machine running sounds, etc., it can be processed in a similar manner as the speech signal to create the corresponding mixed audio training dataset. After that, the deep neural network model can be trained using the corresponding mixed audio training dataset and the compensated audio signals, so that the trained model can be used to process the actual signals. Such process will not be repeated herein.

In the exemplary embodiment, a computer program product is also provided, which includes a non-transitory computer readable storage medium. The non-transitory computer readable storage medium includes computer-executable codes for performing the steps in the method embodiment shown in FIG. 3 or FIG. 4. In some embodiments, the computer program product may be stored in a hardware device, such as an audio device.

The embodiments of the present invention may be implemented by hardware, software, or a combination thereof. The hardware part can be implemented with dedicated logic; the software part can be stored in a memory and executed by an appropriate instruction execution system, such as a microprocessor or specially designed hardware. Those skilled in the art may understand that the above-mentioned devices and methods may be implemented using computer-executable instructions and/or control codes contained in the processor, for example, such codes can be provided on a carrier medium such as a magnetic disk, CD or DVD-ROM, a programmable memory such as a read-only memory (firmware), or a data carrier such as an optical or electronic signal carrier. The device and its modules of the present invention can be implemented by semiconductors such as very large scale integrated circuits or gate arrays, logic chips and transistors, or hardware circuits of programmable hardware devices such as field programmable gate arrays, programmable logic devices, etc. It may also be implemented by software executed by various types of processors, or may be implemented by a combination of the above hardware circuits and software, such as firmware.

It should be noted that although several steps or modules of the audio processing method, device and storage medium of the deep neutral network have been described in the previous paragraphs, such division is exemplary and not mandatory. Practically, according to the embodiments of the present disclosure, the functions and features of two or more modules described above may be embodied in one module. On the other hand, the functions and features of any one module described above may be embodied in two or more modules.

Those skilled in the art may understand and implement other variations to the disclosed embodiments from a study of the drawings, the disclosure, and the appended claims. In the claims, the word "comprising" does not exclude other elements or steps, and the indefinite article "a" or "an" does not exclude a plurality. In applications according to present

What is claimed is:

1. A deep neural network (DNN) based audio processing method, comprising:
obtaining a DNN-based speech extraction model, wherein the speech extraction model is created through the following steps:
obtaining a mixed audio training dataset having multiple mixed audio data frames each containing mixed speech data and non-speech data, the speech data and the non-speech data both being represented in time domain data format;
acquiring at least one audiogram and at least one set of predetermined gain compensation coefficients associated with the at least one audiogram, wherein each audiogram corresponds to a set of predetermined gain compensation coefficients, and each set of predetermined gain compensation coefficients include multiple predetermined gain compensation coefficients corresponding to respective audio signal frequencies;
performing, for each of the mixed audio data frames, gain compensation on the speech data included therein with the at least one set of predetermined gain compensation coefficients to generate compensated speech data; and
training the DNN-based speech extraction model with the mixed audio training dataset and the compensated speech data corresponding to each of the mixed audio data frames of the mixed audio training dataset to obtain a trained speech extraction model;
receiving an audio input object having a speech portion and a non-speech portion, wherein the audio input object includes one or more audio data frames each having a set of audio data samples sampled at a predetermined sampling interval and represented in time domain data format;
obtaining a user audiogram and a set of user gain compensation coefficients associated with the user audiogram; and
inputting the audio input object and the set of user gain compensation coefficients into the trained speech extraction model to obtain an audio output result represented in time domain data format outputted by the trained speech extraction model, wherein the non-speech portion of the audio input object is at least partially attenuated in or removed from the audio output result.

2. The audio processing method of claim 1, wherein the speech data and the non-speech data included in each of the mixed audio data frames are mixed at a predetermined gain ratio.

3. The audio processing method of claim 1, wherein the step of performing, for each of the mixed audio data frames, gain compensation on the speech data included therein with the at least one set of predetermined gain compensation coefficients to generate compensated speech data comprises:
performing Fourier transform on the speech data included in each of the mixed audio data frames to obtain corresponding speech data represented in frequency domain data format;
performing, for each of the mixed audio data frames, gain compensation on the speech data represented in frequency domain data format with the at least one set of predetermined gain compensation coefficients to generate compensated speech data represented in frequency domain data format; and
performing, for each of the mixed audio data frames, inverse Fourier transform on the compensated speech data represented in frequency domain data format to generate the compensated speech data represented in time domain data format.

4. The audio processing method of claim 1, wherein the step of training the DNN-based speech extraction model with the mixed audio training dataset and the compensated speech data corresponding to each of the mixed audio data frames of the mixed audio training dataset to obtain a trained speech extraction model comprises:
training the speech extraction model by using the mixed audio training dataset and the at least one set of predetermined gain compensation coefficients associated with the at least one audiogram as inputs to an input layer of the speech extraction model and using the compensated speech data corresponding to each of the mixed audio data frames of the mixed audio training dataset as outputs of an output layer of the speech extraction model.

5. The audio processing method of claim 1, wherein the speech extraction model is trained with an Error Back Propagation algorithm.

6. The audio processing method of claim 1, wherein the trained speech extraction model has a weighting coefficient set and an offset coefficient set, and the trained speech extraction model comprises multiple processing sublayers each weighting the audio data frames with at least one set of weighting coefficients included in the weighting coefficient set.

7. The audio processing method of claim 6, wherein the DNN is a recurrent neural network.

8. The audio processing method of claim 7, wherein the multiple processing sublayers include at least one Gated Recurrent Unit processing sublayer or a Long Short Time Memory network processing sublayer.

9. The audio processing method of claim 1, wherein an input layer of the speech extraction model comprises a first plurality of neurons for receiving the audio input object, and an output layer of the speech extraction model includes a second plurality of neurons for outputting the audio output result, and wherein a number of the first plurality of neurons is equal to a number of the second plurality of neurons.

10. The audio processing method of claim 9, wherein the input layer of the speech extraction model further comprises a third plurality of neurons for receiving the set of user gain compensation coefficients.

11. The audio processing method of claim 1, wherein the step of acquiring at least one audiogram and at least one set of predetermined gain compensation coefficients associated with the at least one audiogram comprises:
acquiring at least one audiogram; and
for each audiogram, selecting multiple different audio signal frequencies within a frequency range of the audiogram and determining multiple predetermined gain compensation coefficients respectively corresponding to the multiple different audio signal frequencies with a Wide Dynamic Range Compression algorithm.

12. The audio processing method of claim 11, wherein at least one audiogram is generated randomly.

13. The audio processing method of claim 11, wherein the at least one audiogram includes the user audiogram.

14. The audio processing method of claim 1, wherein each audio data frame of the audio input object has a frame length of 1 to 50 milliseconds and a sampling frequency not less than 10 kHz.

15. The audio processing method of claim 1, wherein for each audio signal frequency, each set of predetermined gain compensation coefficients include one or more predetermined gain compensation coefficients corresponding to different loudness respectively.

16. A deep neural network (DNN) based audio processing device, wherein the audio processing device comprises a non-transitory computer storage medium for storing one or more executable instructions that, when executed by a processor, causes the processor to perform:
obtaining a DNN-based speech extraction model, wherein the speech extraction model is created through the following steps:
obtaining a mixed audio training dataset having multiple mixed audio data frames each containing mixed speech data and non-speech data, the speech data and the non-speech data both being represented in time domain data format;
acquiring at least one audiogram and at least one set of predetermined gain compensation coefficients associated with the at least one audiogram, wherein each audiogram corresponds to a set of predetermined gain compensation coefficients, and each set of predetermined gain compensation coefficients include multiple predetermined gain compensation coefficients corresponding to respective audio signal frequencies;
performing, for each of the mixed audio data frames, gain compensation on the speech data included therein with the at least one set of predetermined gain compensation coefficients to generate compensated speech data; and
training the DNN-based speech extraction model with the mixed audio training dataset and the compensated speech data corresponding to each of the mixed audio data frames of the mixed audio training dataset to obtain a trained speech extraction model;
receiving an audio input object having a speech portion and a non-speech portion, wherein the audio input object includes one or more audio data frames each having a set of audio data samples sampled at a predetermined sampling interval and represented in time domain data format;
obtaining a user audiogram and a set of user gain compensation coefficients associated with the user audiogram; and
inputting the audio input object and the set of user gain compensation coefficients into the trained speech extraction model to obtain an audio output result represented in time domain data format outputted by the trained speech extraction model, wherein the non-speech portion of the audio input object is at least partially attenuated in or removed from the audio output result.

17. The audio processing device of claim 16, wherein the audio processing device is a hearing assistance device.

18. A non-transitory computer storage medium having stored therein one or more executable instructions that, when executed by a processor, causes the processor to perform:
obtaining a DNN-based speech extraction model, wherein the speech extraction model is created through the following steps:
obtaining a mixed audio training dataset having multiple mixed audio data frames each containing mixed speech data and non-speech data, the speech data and the non-speech data both being represented in time domain data format;
acquiring at least one audiogram and at least one set of predetermined gain compensation coefficients associated with the at least one audiogram, wherein each audiogram corresponds to a set of predetermined gain compensation coefficients, and each set of predetermined gain compensation coefficients include multiple predetermined gain compensation coefficients corresponding to respective audio signal frequencies;
performing, for each of the mixed audio data frames, gain compensation on the speech data included therein with the at least one set of predetermined gain compensation coefficients to generate compensated speech data; and
training the DNN-based speech extraction model with the mixed audio training dataset and the compensated speech data corresponding to each of the mixed audio data frames of the mixed audio training dataset to obtain a trained speech extraction model;
receiving an audio input object having a speech portion and a non-speech portion, wherein the audio input object includes one or more audio data frames each having a set of audio data samples sampled at a predetermined sampling interval and represented in time domain data format;
obtaining a user audiogram and a set of user gain compensation coefficients associated with the user audiogram; and
inputting the audio input object and the set of user gain compensation coefficients into the trained speech extraction model to obtain an audio output result represented in time domain data format outputted by the trained speech extraction model, wherein the non-speech portion of the audio input object is at least partially attenuated in or removed from the audio output result.

* * * * *